Patented Sept. 24, 1946

2,408,324

UNITED STATES PATENT OFFICE 2,408,324

HYDRATED DOLOMITIC LIMES AND METHOD OF REDUCING THE PLASTICITY OF AQUEOUS SUSPENSIONS THEREOF

Chauncey C. Loomis, Lee, and William J. Barrett, Adams, Mass., assignors to New England Lime Company, Adams, Mass., a corporation of Massachusetts No Drawing. Application February 19, 1941, Serial No. 379,642

16 Claims. (Cl. 106—109)

The present invention relates to dolomitic limes which are more than normally hydrated, that is, dolomitic limes in which the magnesium oxide has been slaked or hydrated to at least about 35% of its content, and which are characterized by the formation of quick plasticity mixtures with water in the preparation of a white putty for use in plaster coats, and to a method of mixing such hydrated dolomitic limes with water whereby uniform soaking is quickly and conveniently obtained.

The term "dolomitic lime" as used in this specification and in the appended claims is to be understood to refer to the commercial dolomitic limes employed, for example, in the building industry. These limes contain calcium oxide and magnesium oxide in approximately equal molecular proportion, and they are prepared from dolomites which, except for the usual small proportion of impurities, consist essentially of calcium and magnesium carbonates.

It is one of the objects of the present invention to provide a relatively highly slaked or hydrated dolomitic lime composition which, on addition to a predetermined amount of water sufficient to soak the lime for the production of a putty, will mix uniformly with the water even when poured into it by hand in the manner customary in the art.

It is a further object of the invention to provide a hydrated dolomitic lime composition whose original magnesium oxide content has been hydrated to at least about 35% and which is characterized by an increase in its thickening qualities simultaneously with a reduction in its plasticity on soaking with water, so that more uniform distribution of the predetermined amount of water in the dolomitic lime material is attained.

It is also an object of the invention to provide a relatively highly hydrated dolomitic lime composition which, on gauging by the plasterer (mixing with gypsum to form the white putty ready for application to a wall or the like) causes the mixture to suffer no increase in thickness or body, but at the same time loses no essential degree of plasticity.

It is a still further object of the invention to provide an improved method of mixing hydrated dolomitic limes with water whereby the formation of heavy plastic masses upon the addition of only a part of the lime to be mixed is prevented and uniform soaking of the whole amount thereby promoted; while at the same time, the gauging of the soaked mixture causes no loss of plasticity.

Other objects and advantages of the invention will be apparent as the more detailed description of the invention proceeds and the features of novelty will be set forth in the appended claims.

It is the common practice in the soaking of hydrated limes in water merely to empty the bags containing the lime into a tank or mortar box containing the measured amount of water. The workmen depend upon gravity to obtain proper distribution of the lime upon the bottom of the tank and to effect mixture of the lime with the water. In this operation, there is ordinarily no attempt to effect mixing by hand. Consequently, if difficulty is encountered in the proper distribution of the lime in the water, or in accomplishing complete and uniform soaking of the lime with the measured amount of water for any reason whatever, this type of lime is usually condemned because the resulting mass is non-uniform with regard to soaking, parts occasionally even remaining almost dry. Limes, and especially dolomitic limes, which do not lend themselves to this simple method of soaking are therefore not serviceable for the standard procedures employed by the workmen.

In the hydrated dolomitic limes in which the magnesium oxide has been hydrated at least to a considerable extent, that is, to at least 35% of its total content, and which are employed for the preparation of white or finishing plaster coats, difficulty has been encountered both in the process of mixing this hydrated material with water to form a putty, and in the mixing of the lime putty by the plasterer with the usual amount of gauging plaster (partially dehydrated gypsum). It is known that when such a quick-plastic, hydrated calcium-magnesium lime (dolomitic lime) in the form of dry powder, is poured into a mortar box containing a more or less accurately measured amount of water, the initially introduced powder tends to form quickly a rather thick, plastic mass which entrains or absorbs a large proportion of the water, with the result that after a relatively small portion of the slaked dolomitic lime has been added, the whole mass of water is absorbed by a pasty, plastic material which prevents the subsequently added lime from penetrating thereinto and becoming mixed with the water. In consequence, the last portions of such dolomitic lime merely rest upon the pasty mass and do not become adequately moistened. It is generally inadvisable to attempt to mix the materials thoroughly by hand, as with a hoe, because lumps tend to form which cannot easily be broken up. This difficulty has been so common that contractors and workmen have quite universally condemned this form of lime (dolomitic lime in which the magnesium oxide content has been slaked to at least about 35% for use in the application of white coat. While this difficulty was not ordinarily encountered in "normally" hydrated dolomitic limes in which only the calcium oxide had been slaked, the magnesium remaining substantially completely in the form of the oxide, and only about 2% of the magnesium oxide being hydrated, it was quite generally encountered with those dolomitic limes in which the magnesium oxide had been hydrated to about 35% or more of its content.

It appears that the tendency of the more than normally hydrated dolomitic limes to form rapidly a relatively thick plastic mass with water is due to the presence of the magnesium hydroxide, as similar heavy pastes are ordinarily not encountered with limes containing the magnesium oxide in the unhydrated condition, or with more or less pure calcium hydroxide limes. While we do not wish to be understood as being committed thereto, it is our belief that the tendency of the more than normally hydrated dolomitic limes to absorb large volumes of water and form a highly plastic mass is due to the coloidal condition of the magnesium hydroxide, which appears to favor the rapid formation of a plastic with water.

Also, when a quantity of calcium sulfate, in any form, is mixed with a sufficient amount of water to yield a gauging plaster mass having a consistency corresponding to a penetration of 20 mm. as measured with a modified Vicat needle as used for the Emley plasticity test, and is mixed with a pasty mass of the above described hydrated dolomitic lime of exactly the same consistency, the consistency of the mixture is considerably higher than that of the two separate components, there being a very noticeable thickening of the mixture. This is highly objectionable to the workman, for the mass becomes more difficult to mix uniformly and to apply.

The use of relatively highly hydrated dolomitic limes for plaster coat work has thus met with serious opposition because of its tendency to form a plastic mass on soaking, and a thick mass on gauging.

According to the present invention, relatively highly hydrated dolomitic limes are so modified by certain additions, a fraction of one-percent being generally sufficient, that their plasticity is reduced on soaking and at the same time thickening prevented on gauging, the final plasticity of the gauged putty being not substantially different from that of the ungauged hydrated dolomitic lime putty.

In accordance with our invention, we add to the highly hydrated dolomitic lime containing hydrated magnesia as above described, a substance which acts to reduce the plasticity of aqueous suspensions of the lime in the formation of a putty, thus acting as a "de-plastifier," and which operates further (and this is perhaps an even more important action) to reduce the thickening of the mixture on gauging with gypsum (which term is herein employed in the sense in which it is used in the building industry, namely, to indicate the only partially hydrated calcium sulfate, also known as plaster of Paris), at such time acting as a "de-thickener." In all probability, the de-plastifying action is a result of causing flocculation of the magnesium hydroxide when the mixture is poured into water, as by reducing its hydrophilic properties. In other words, if the plasticity phenomenon above referred to is actually due, as we believe, to the colloidal condition of the magnesium hydroxide, the de-plastifier acts to reduce the colloidal and hydrophilic properties of the latter. Whatever the physical or physicochemical action may be, we have found that the problem may be solved by the addition of suitable agents, such as salts or acids, which act to keep the mixture of slaked dolomitic lime, and the predetermined amount of water to be associated therewith, in a more fluid state, so that a uniform mixture may be readily obtained. As a result, the soaking and gauging of the slaked dolomitic lime can be carried out without difficulty. The portions of the lime first added to the body of water sink to the bottom, forming a thickened mass of enlarged volume but with only a portion of the water. More or less free water is thus available to the subsequently added portions of the lime. Where the lime is added to the prescribed amount of water, all of it, including the last added portions, finds an adequate quantity of free water with which to mix and in which to become soaked. Whereas, heretofore, the dolomitic lime acted like a plastifying agent for the water, only a small amount acting quickly to convert the whole body of water into a plastic mass, the modified dolomitic lime according to the invention acts more nearly like a dolomitic lime in which the magnesium oxide has not been hydrated to any considerable extent.

The de-plastifiers and de-thickeners according to the invention are substances which are of low solubility or form compounds of low solubility with the dolomitic lime. One of the preferred substances for bringing about the results just described is calcium sulfate either in the hydrous, hemihydrated or dehydrated form. We have found that it is sufficient to add only so much of calcium sulfate to the slaked dolomitic lime as ordinarily will dissolve in the amount of water to be used with such lime, although somewhat smaller and also larger amounts may be used. One-tenth per centum of calcium sulfate based on the weight of the dolomitic lime, has been found by us to give satisfactory results, and in general a quantity of about 0.1 to about 0.5% will be sufficient. It is of no great advantage to employ more than 0.5% of the sulfate. Thus 1% may be used and even larger amounts, but the desired action will in general be accomplished by only that portion which becomes dissolved in the water.

It will be seen from the foregoing that whereas, heretofore, the highly hydrated dolomitic limes suffered from excessive plasticity on soaking and excessive thickening on gauging, the "inoculated" lime of the present invention is characterized by an increased thickening (and reduced plasticity) on soaking, which is highly desirable, with no increase of consistency or loss of plasticity on gauging.

Thus we have found that with a slaked dolomitic lime which when mixed with the proper amount of water had a plasticity of 400 on the Emley plasticimeter (the mixture being prepared in a mechanical mixer to insure a thoroughly uniform condition), the plasticity will fall to 250 upon the addition of 0.2% of calcium sulfate. This drop in plasticity would, however, occur anyway on gauging as heretofore practiced. On gauging, that is, on mixing with the proper amount of water and gypsum to form the finished white putty ready for application to a wall or the like, the mixture containing our "inoculated" lime will still have a plasticity of 250, that is, there will be no further decrease in plasticity and accompanying increase of body. The "inoculated" material according to the invention which, as just mentioned, will have a plasticity of 250 after the soaking, will thus have the same plasticity on gauging as the "non-inoculated" material which prior to gauging had a plasticity of 400. However, with the inoculated material, the thickening which would otherwise occur on gauging, is practically entirely eliminated.

In place of calcium sulfate, other polar compounds like sodium sulfate, sodium acid sulfate, magnesium sulfate, zinc sulfate, aluminum sulfate, or even sulfuric acid may be employed, in approximately equivalent proportions to the calcium sulfate, since they will all yield calcium sulfate on reacting with dolomitic lime. Alkali metal and alkaline earth metal sulfites, thiosulfates, phosphates, for example, sodium and potassium sulfites and thiosulfates, magnesium sulfite, trisodium phosphate, sodium hexametaphosphate, sodium tetraphosphate, other alkali metal phosphates, and even phosphoric acid, and other substances forming calcium compounds of, preferably, low solubility and which flocculate colloidal magnesium hydroxide may also be used, but calcium sulfate is preferred because of its low cost and convenience in handling. The compounds should have at least a small degree of solubility, say, of the order of that of calcium sulfate or thiosulfate; highly insoluble compounds like barium sulfate are not suitable.

The sulfate or other material can be incorporated in various ways with the hydrated dolomitic lime. For example, it may be added to the water used for slaking the dolomitic quick lime, or it may be mixed mechanically with the dry hydrated lime, as in a mechanical mixer, operating either by a batch process or continuously. The sulfate or other material can also be added to the water in which the hydrated dolomitic lime is to be soaked on the job prior to use. Where free acid is used, we prefer to mix it with the slaking water or with the water for the putty mix. If desired, mixtures of different additions may be used; thus a sulfate may be used with a thiosulfate, a sulfite or a phosphate, or a sulfite with a phosphate, etc.

It will be noted that the de-plastifying (during soaking) and de-thickening (during gauging) agents employed by us are compounds which either are or yield substances of low solubility, in contra-distinction to substances like calcium chloride or hydrochloric acid which would yield a highly soluble component in the white putty, which is highly undesirable as it would tend to wash out when the coating is moistened or would tend to deliquesce. Our invention thus contemplates substances which, while they consist of or form products having a certain degree of solubility as to impair the water-proofness or water-resistance of the plaster coat.

While our invention, as above described, is applicable to hydrated dolomitic limes whose magnesium oxide has been hydrated to the extent of about 35% and higher, we prefer to employ dolomitic limes wherein the magnesia hydration is as high as 75% and above.

We claim:

1. A hydrated dolomitic lime whose magnesium oxide content is slaked to at least about 35%, mixed with about 1% or less of an agent capable of preventing thickening of a putty made of such lime, on gauging with gypsum.

2. A hydrated dolomitic lime whose magnesium oxide content is slaked to at least about 35%, mixed with about 1% or less of a flocculating agent for colloidal magnesium hydroxide, whereby on soaking to form a putty a product of reduced plasticity and increased thickness is obtained.

3. A hydrated dolomitic lime phose magnesium oxide content is hydrated to at least about 35%, mixed with about 1% or less of a compound having an acid radical with which calcium forms a salt of low solubility, whereby on soaking to form a putty a product of reduced plasticity and increased thickness is obtained.

4. A hydrated dolomitic lime mixture comprising a hydrated dolomitic lime whose magnesium oxide content has been hydrated to at least about 35%, and a small proportion of a sulfate having at least a small degree of solubility.

5. A hydrated dolomitic lime mixture comprising a hydrated dolomitic lime whose magnesium oxide content has been hydrated to at least about 35%, and about 0.1 to 0.5% of an agent capable of preventing thickening of a putty made of such lime, on gauging with gypsum.

6. A hydrated dolomitic lime mixture comprising a hydrated dolomitic lime whose magnesium oxide content has been hydrated to at least about 35%, and a small proportion of calcium sulfate.

7. A hydrated dolomitic lime mixture comprising a hydrated dolomitic lime whose magnesium oxide content has been hydrated to at least about 35%, and about 0.1 to 0.5% of calcium sulfate based upon the weight of such lime.

8. A hydrated dolomitic lime mixture comprising a hydrated dolomitic lime whose magnesium oxide content has been hydrated to at least 75%, and about 0.1 to 0.5% of calcium sulfate based upon the weight of such lime.

9. A hydrated dolomitic lime mixture comprising a hydrated dolomitic lime whose magnesium oxide content has been hydrated to at least about 35%, and a small proportion of a phosphate having at least a small degree of solubility.

10. The method of treating a hydrated dolomitic lime whose magnesium oxide content has been hydrated to at least about 35%, to render the same capable of forming suspensions of low plasticity on addition to water, which comprises adding thereto a small proportion of a sulfate having at least some degree of solubility.

11. The method of treating a hydrated dolomitic lime whose magnesium oxide content has been hydrated to at least about 35%, to render the same capable of forming suspensions of low plasticity on addition to water, which comprises adding thereto a small proportion of calcium sulfate.

12. The method of treating a hydrated dolomitic lime whose magnesium oxide content has been hydrated to at least about 35%, to render the same capable of forming suspensions of low plasticity on addition to water, which comprises adding thereto a small proportion of sulfuric acid.

13. The method of soaking a hydrated dolomitic lime whose magnesium oxide content has been hydrated to at least about 35%, which comprises adding a sulfate of at least some degree of solubility to the soaking water, and then pouring the hydrated dolomitic lime into the pretreated water.

14. The method according to claim 13, wherein the sulfate is calcium sulfate.

15. The method according to claim 13, wherein the sulfate is sulfuric acid.

16. The method according to claim 13, wherein the quantity of sulfate is of the order of about 0.1 to 0.5% of the weight of the dolomitic lime.

CHAUNCEY C. LOOMIS.
WILLIAM J. BARRETT.